(12) United States Patent
Held

(10) Patent No.: US 7,175,224 B2
(45) Date of Patent: Feb. 13, 2007

(54) CANOPY HOUSING

(76) Inventor: William T. Held, 191 Buffalo Creek Rd., Elma, NY (US) 14059

( * ) Notice: Subject to any disclaimer, the term of this patent is extended or adjusted under 35 U.S.C. 154(b) by 0 days.

(21) Appl. No.: 11/241,287

(22) Filed: Sep. 30, 2005

(65) Prior Publication Data

US 2006/0163905 A1  Jul. 27, 2006

Related U.S. Application Data

(60) Provisional application No. 60/646,809, filed on Jan. 25, 2005.

(51) Int. Cl.
*B60R 9/058* (2006.01)
(52) U.S. Cl. ............ 296/102; 296/107.08; 296/100.01; 296/37.16; 135/88.07; 224/309
(58) Field of Classification Search ............... 296/37.1, 296/37.7, 37.16, 35.4, 102, 107.08, 100.01, 296/100.11, 100.18, 77.1, 136.05, 136.06; 224/274, 309, 327–329; 135/88.01, 88.07, 135/88.09
See application file for complete search history.

(56) References Cited

U.S. PATENT DOCUMENTS

| | | | |
|---|---|---|---|
| 8,222 A | 7/1851 | Hibbard |
| 208,564 A | 10/1878 | Bowers |
| 1,470,630 A | 10/1923 | Mahr |
| 1,819,490 A | 8/1931 | Weiss |
| 2,159,309 A | 5/1939 | Betourne |
| 2,509,195 A | 5/1950 | Barron |
| 2,593,909 A | 4/1952 | Moreland |
| 2,627,865 A | 2/1953 | Mitchell et al. |
| 2,689,579 A | 9/1954 | Sartori |
| 2,829,659 A | 4/1958 | Megenity |
| 2,907,364 A | 10/1959 | Trenery |
| 3,059,681 A | 10/1962 | Lorbeski |
| 3,460,597 A | 8/1969 | Day |
| 3,671,071 A | 6/1972 | Evinrude |
| 3,913,648 A | 10/1975 | Sessler |
| 4,008,874 A | 2/1977 | Conway, Jr. |
| 4,013,315 A | 3/1977 | West |
| 4,037,614 A | 7/1977 | Hines et al. |
| 4,084,599 A | 4/1978 | Matthews |
| 4,098,536 A | 7/1978 | Mills |
| 4,106,145 A | 8/1978 | Gillen et al. |
| 4,200,133 A | 4/1980 | Whitlow |

(Continued)

FOREIGN PATENT DOCUMENTS

DE  3517967 A1  11/1985

(Continued)

*Primary Examiner*—D. Glenn Dayoan
*Assistant Examiner*—Greg Blankenship
(74) *Attorney, Agent, or Firm*—Hodgson Russ LLP

(57) ABSTRACT

The invention may be embodied as a cart canopy housing having a canopy storage portion, a roof engaging portion and a side panel portion extending from the roof engaging portion and from the canopy storage portion so as to enable partial concealment of a roof support when the housing is installed on a cart. The invention may also be embodied as a cart roof having a cover portion, a canopy storage portion, and a side panel portion extending from the cover portion and the canopy storage portion so as to enable partial concealment of a roof support when the cover portion is installed on a cart.

15 Claims, 12 Drawing Sheets

U.S. PATENT DOCUMENTS

| | | |
|---|---|---|
| 4,332,415 A | 6/1982 | Williams |
| 4,344,285 A | 8/1982 | Ridge |
| 4,402,544 A | 9/1983 | Artim et al. |
| 4,442,937 A | 4/1984 | Delauder |
| 4,453,632 A | 6/1984 | Clower |
| 4,469,114 A * | 9/1984 | Kelley et al. ............... 135/133 |
| 4,474,388 A | 10/1984 | Wagner |
| 4,621,859 A | 11/1986 | Spicher |
| D287,041 S | 12/1986 | Gitchel et al. |
| 4,641,879 A | 2/1987 | Kassai |
| D291,878 S | 9/1987 | Cook |
| 4,699,164 A | 10/1987 | Pilney et al. |
| 4,748,995 A | 6/1988 | Viglione |
| 4,773,694 A * | 9/1988 | Gerber ....................... 296/77.1 |
| 4,788,996 A | 12/1988 | Forshee |
| 4,830,037 A | 5/1989 | Held |
| 4,846,524 A | 7/1989 | Gerber |
| 4,915,120 A | 4/1990 | Ziolkowski |
| 4,979,548 A | 12/1990 | Howard, III et al. |
| 5,005,623 A | 4/1991 | Webster, Jr. |
| 5,024,259 A | 6/1991 | Treadway |
| 5,050,730 A | 9/1991 | Suberbielle |
| 5,058,642 A | 10/1991 | Tuntland |
| 5,058,943 A | 10/1991 | Louderback |
| 5,069,481 A | 12/1991 | Strange |
| 5,072,987 A | 12/1991 | Allen |
| 5,131,442 A | 7/1992 | Bevier |
| 5,146,967 A | 9/1992 | Chapman |
| D330,350 S | 10/1992 | Maypole et al. |
| 5,190,340 A | 3/1993 | Nuscher |
| 5,217,275 A | 6/1993 | Ridge |
| 5,259,656 A | 11/1993 | Carroll |
| 5,388,881 A | 2/1995 | Spencer et al. |
| D363,265 S | 10/1995 | Althoff |
| 5,588,690 A * | 12/1996 | Showalter .................. 296/77.1 |
| 5,741,041 A | 4/1998 | Sullivan |
| D394,637 S | 5/1998 | Camiano |
| 5,788,317 A * | 8/1998 | Nation ........................ 296/141 |
| 5,819,829 A | 10/1998 | Matthews |
| D413,283 S | 8/1999 | Stepp et al. |
| 6,007,134 A | 12/1999 | Weston |
| 6,068,325 A | 5/2000 | Hughes |
| D431,018 S | 9/2000 | Maypole |
| 6,186,584 B1 | 2/2001 | Samuelson et al. |
| 6,199,932 B1 | 3/2001 | Welsh et al. |
| 6,202,850 B1 | 3/2001 | Held |
| 6,216,714 B1 * | 4/2001 | Tucker .................... 135/88.01 |
| 6,220,647 B1 | 4/2001 | Winkler |
| 6,227,217 B1 | 5/2001 | Peta |
| 6,227,603 B1 | 5/2001 | Brock |
| 6,260,908 B1 | 7/2001 | Fraula et al. |
| 6,276,424 B1 | 8/2001 | Frey, Jr. |
| 6,343,613 B1 | 2/2002 | Yasutomi |
| 6,416,109 B1 | 7/2002 | Tyrer et al. |
| 6,439,637 B1 | 8/2002 | Tyrer |
| D463,999 S | 10/2002 | Beck et al. |
| 6,464,291 B2 | 10/2002 | Hynds et al. |
| 6,471,280 B1 | 10/2002 | Fowler |
| 6,471,281 B1 | 10/2002 | Tyrer et al. |
| 6,494,246 B1 | 12/2002 | Blevins |
| D469,734 S | 2/2003 | Tyrer |
| 6,520,569 B2 | 2/2003 | Wingen et al. |
| 6,547,304 B1 | 4/2003 | Conner et al. |
| 6,547,312 B2 | 4/2003 | Winkler |
| 6,561,257 B2 | 5/2003 | Huang |
| 6,565,139 B2 | 5/2003 | Bayerle et al. |
| D478,859 S | 8/2003 | Tyrer |
| 6,601,904 B2 | 8/2003 | Winkler |
| 6,619,726 B2 | 9/2003 | Jones |
| 6,655,725 B2 | 12/2003 | Soldatelli |
| 6,663,161 B1 | 12/2003 | Tyrer |
| 6,663,162 B1 | 12/2003 | Tyrer |
| D491,876 S | 6/2004 | Geisler et al. |
| 6,761,391 B2 * | 7/2004 | Winkler ....................... 296/79 |
| 6,773,052 B1 | 8/2004 | Tyrer |
| D497,587 S | 10/2004 | Tyrer |
| 6,802,327 B2 * | 10/2004 | Koss ....................... 135/88.08 |
| 6,953,216 B2 | 10/2005 | Held |
| 6,979,044 B2 | 12/2005 | Tyrer |
| D513,490 S | 1/2006 | Held |
| 2002/0027373 A1 | 3/2002 | Winkler |
| 2002/0083971 A1 | 7/2002 | Blount |
| 2002/0167192 A1 | 11/2002 | Tyrer et al. |
| 2003/0183262 A1 | 10/2003 | Tyrer |

FOREIGN PATENT DOCUMENTS

| | | |
|---|---|---|
| GB | 2452 | 9/1911 |
| GB | 2103938 A | 3/1983 |

* cited by examiner

CANOPY HOUSING

CROSS-REFERENCE TO RELATED APPLICATION

This application claims the benefit of priority to U.S. provisional patent application Ser. No. 60/646,809, filed on Jan. 25, 2005.

FIELD OF THE INVENTION

The present invention relates to housings for canopies used to cover the rear portion of a cart, such as a golf cart.

BACKGROUND OF THE INVENTION

The prior art includes retractable canopies for attaching to a cart so that the rear portion of the cart is protected from sun and rain. Often the prior art devices will provide a U-shaped bar supporting a fabric canopy, and the bars will be hinged so that the canopy may be deployed to cover the rear portion of the cart, or retracted so that the canopy does not cover the rear portion of the cart. The prior art devices do not adequately protect the rear portion of the golf cart, and the items being carried in the rear portion of the golf cart. Furthermore, the prior art devices leave unsightly portions of the canopy and cart exposed to view, particularly when the canopy is in the retracted position.

SUMMARY OF THE INVENTION

The present invention may be embodied as a cart canopy housing having a canopy storage portion, a roof engaging portion and a side panel portion extending from the roof engaging portion and from the canopy storage portion so as to enable partial concealment of a roof support when the housing is installed on a cart. The present invention may also be embodied as a cart roof having a cover portion, a canopy storage portion, and a side panel portion extending from the cover portion and the canopy storage portion so as to enable partial concealment of a roof support when the cover portion is installed on a cart.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

The invention will be described below with reference to examples that embody features of the invention. FIGS. 1 through 7 depict a device according to the invention. In FIGS. 1 through 7 there is shown a cart canopy housing 10 that has a canopy storage portion 13, a roof engaging portion 16 and a side panel portion 19.

Figure 4:
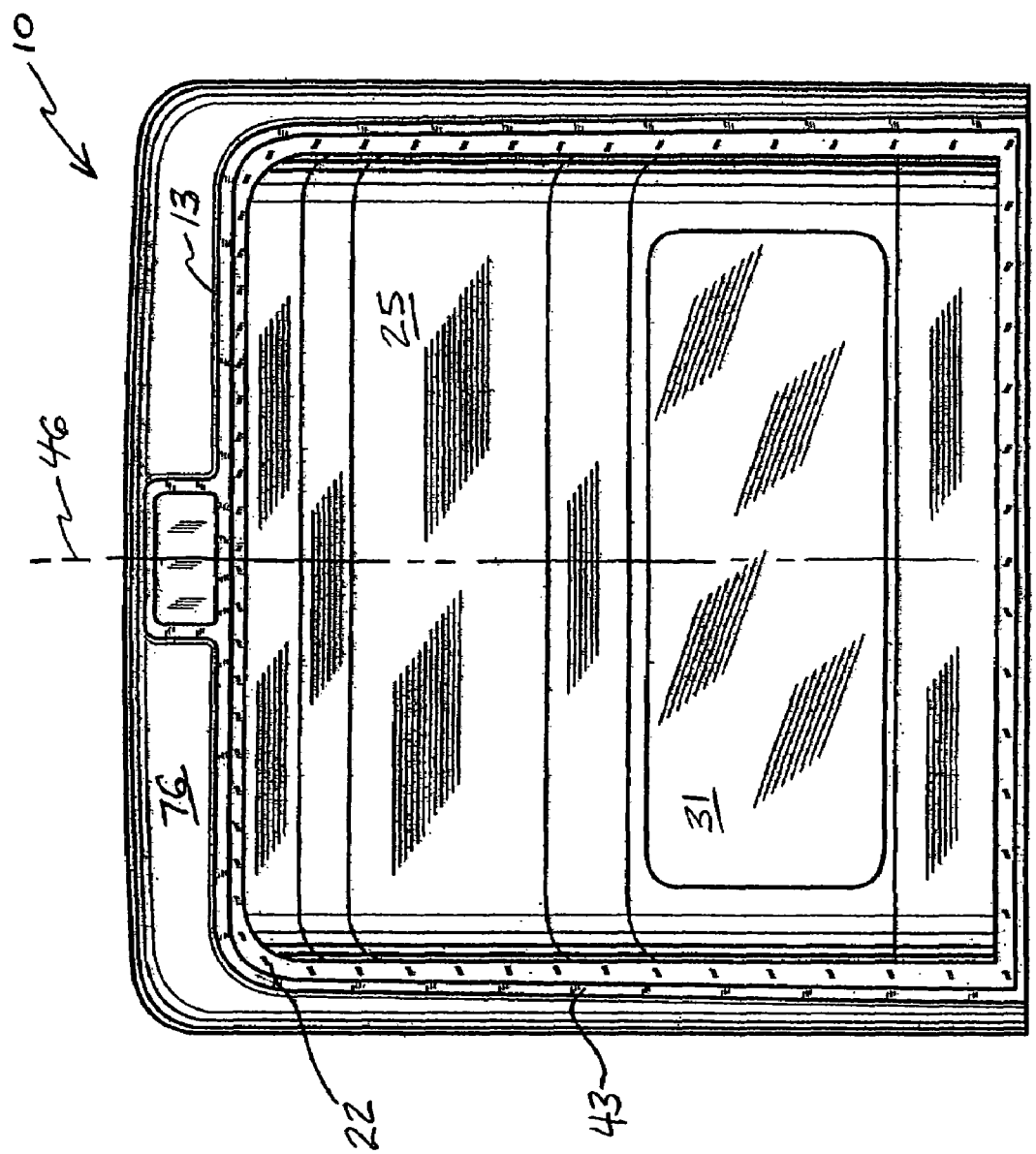
FIG. 4, which is a rear view of the housing shown in FIG. 1 with the canopy in the deployed position.
Figure 5:
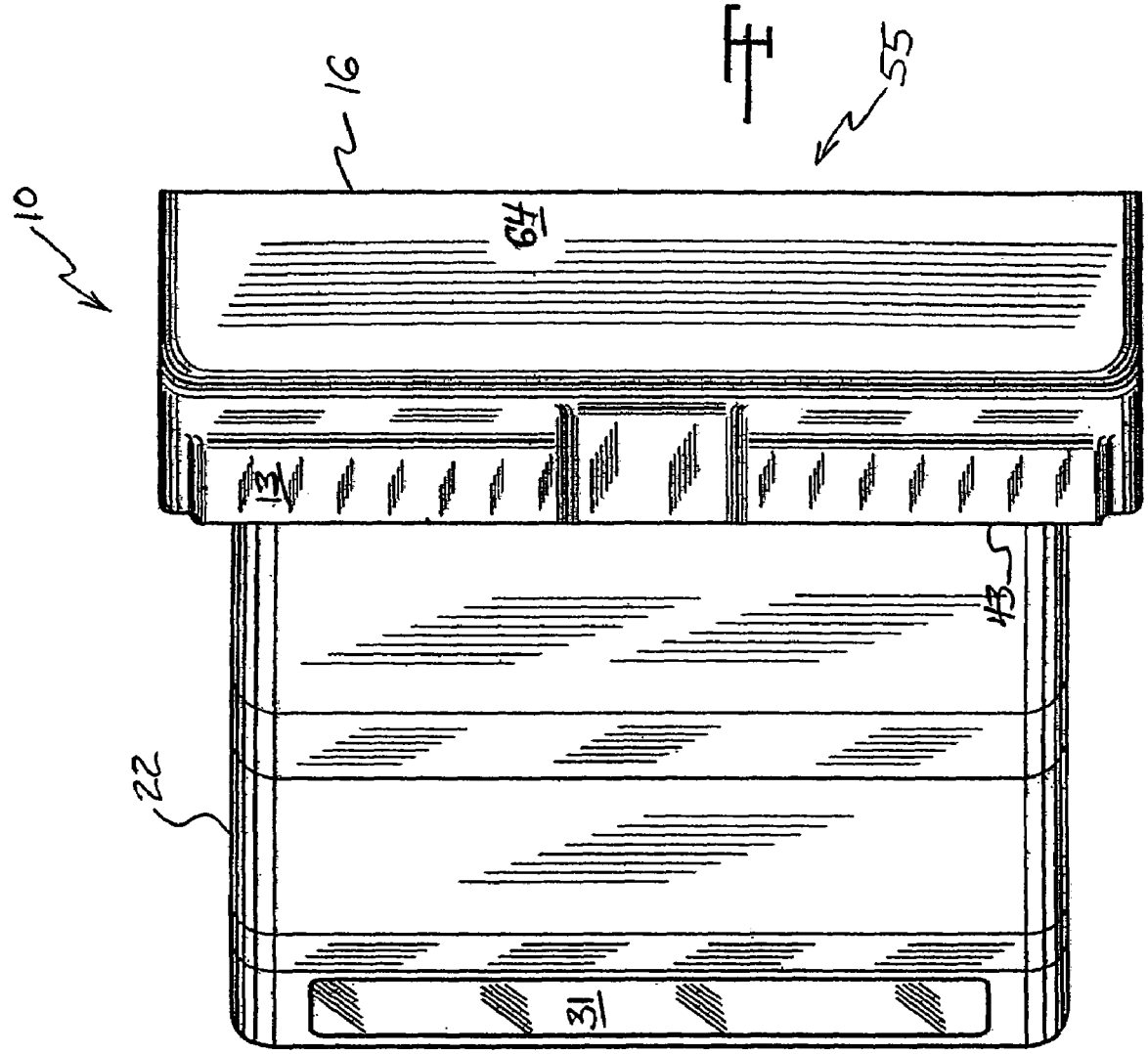
FIG. 5, which is a top view of the housing shown in FIG. 1 with the canopy in the deployed position.
Figure 6:
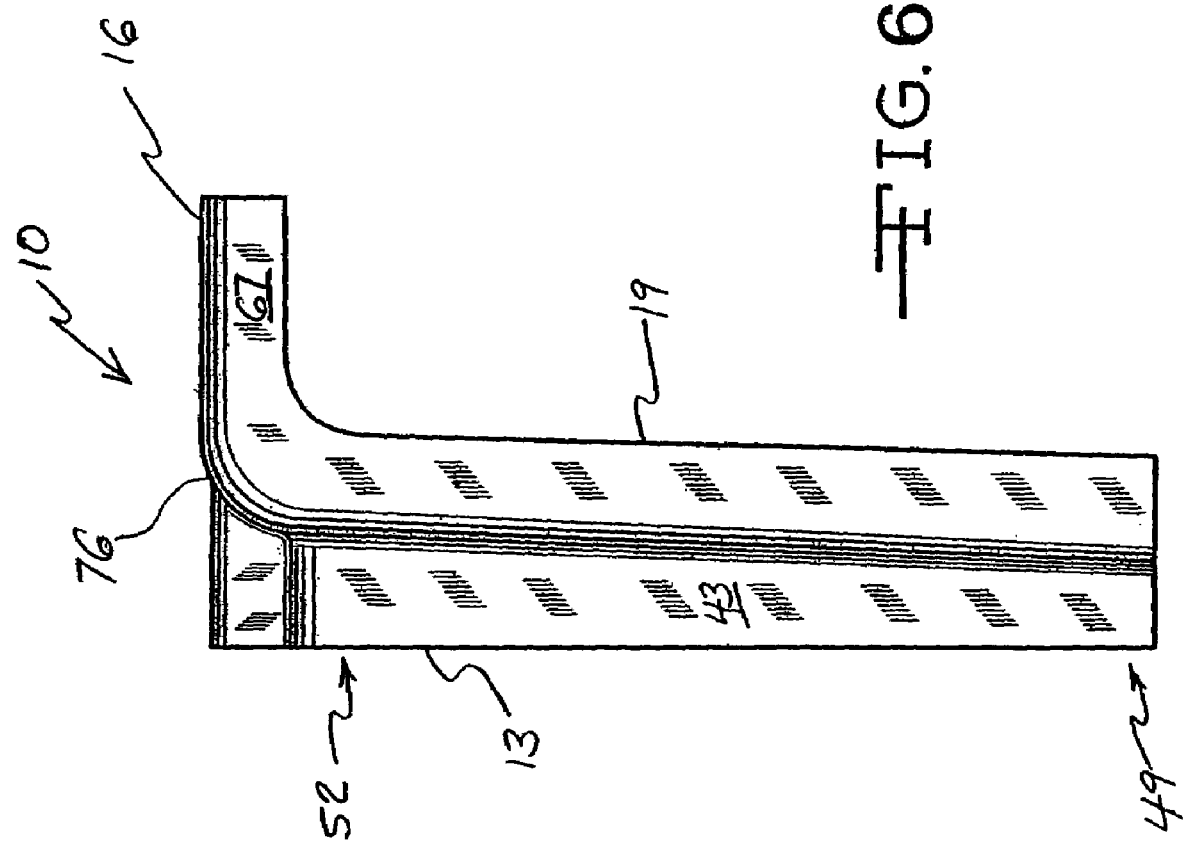
FIG. 6, which is a side view of the housing shown in FIG. 1 with the canopy in the stored position.
Figure 7:
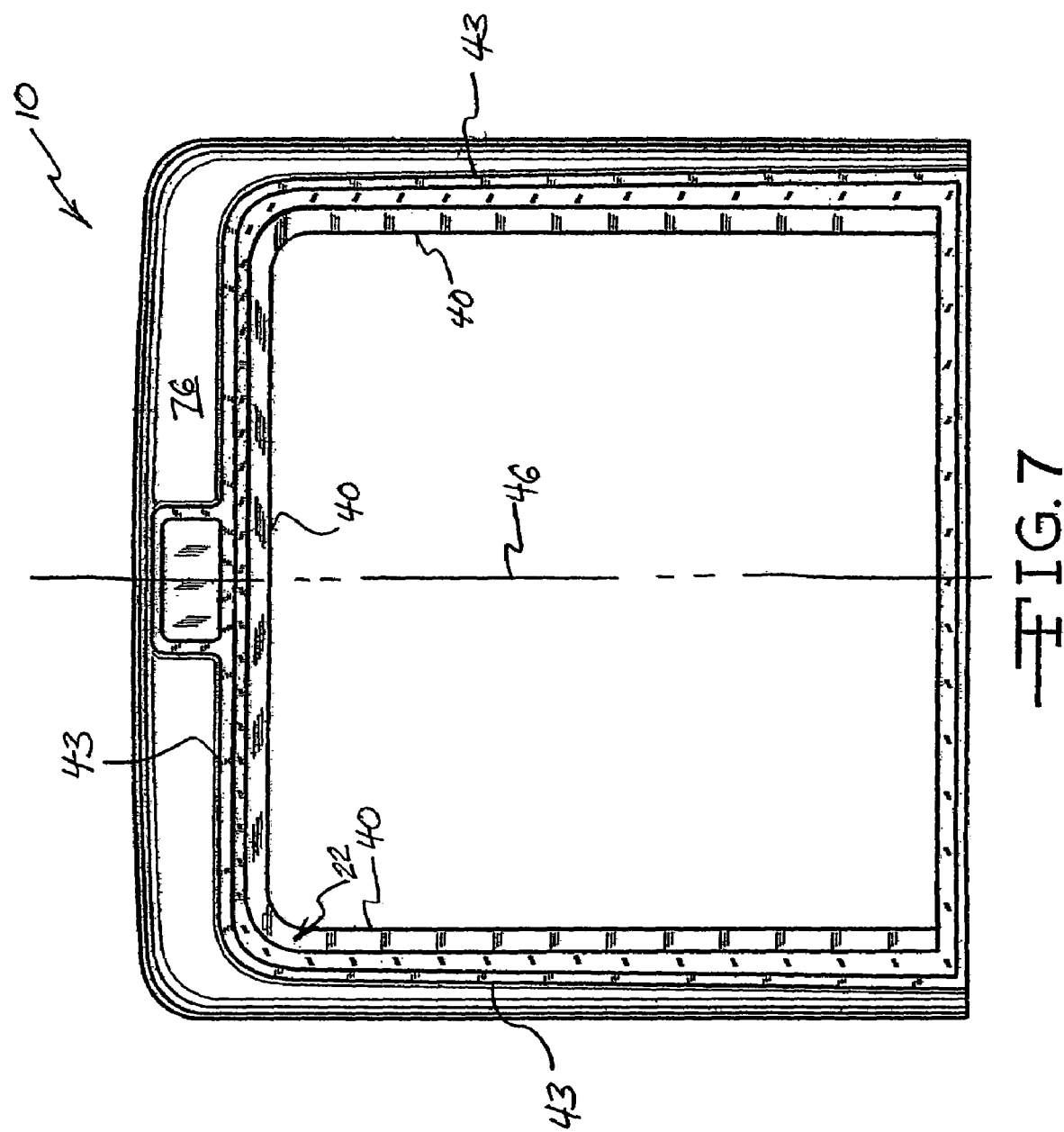
FIG. 7, which is a rear view of the housing shown in FIG. 1 with the canopy in the stored position.
Figure 8:
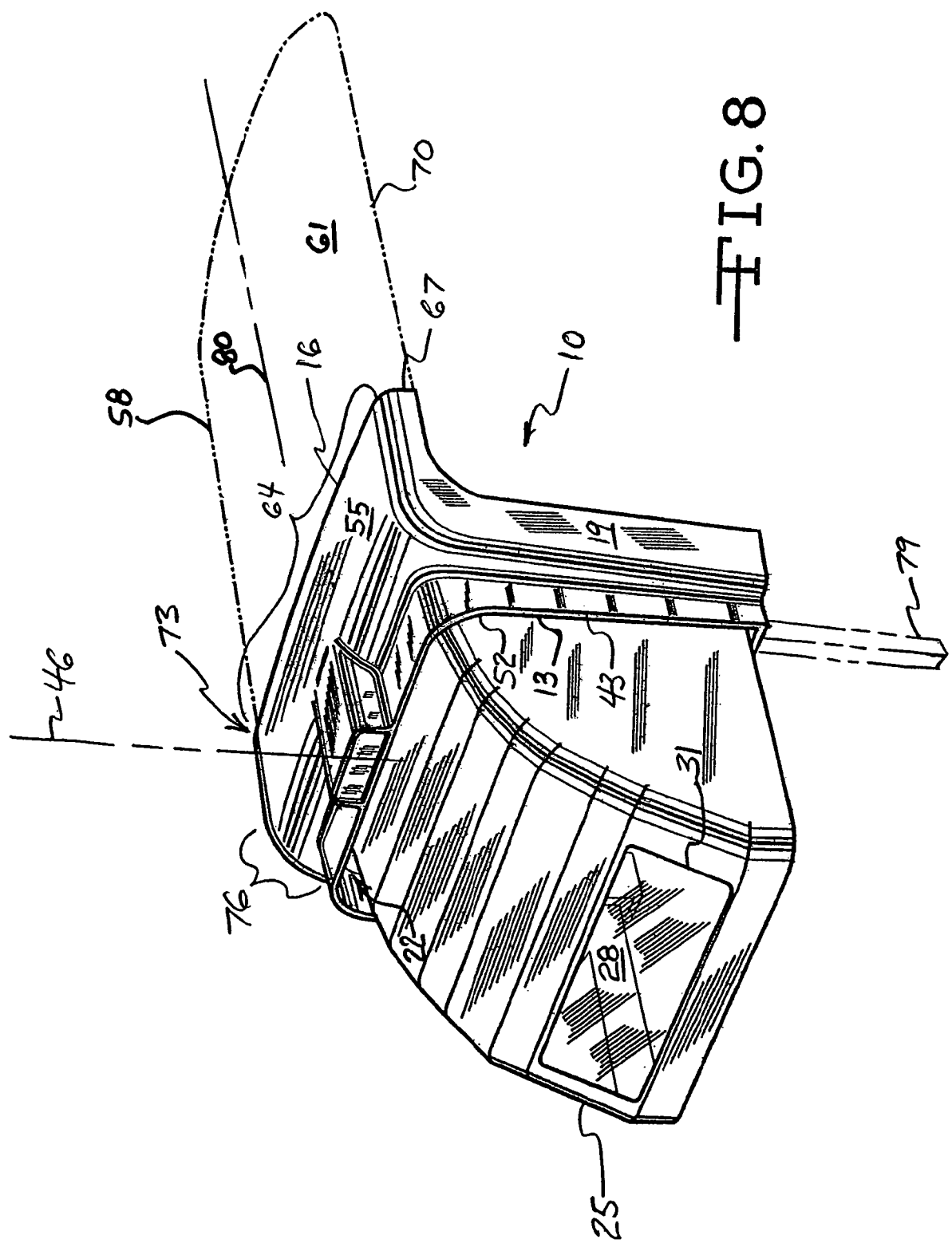
FIG. 8, which is a perspective view of a housing according to the invention with the canopy in the deployed position and supported by four bars.

The canopy storage portion 13 is shown having an opening 22 for receiving a retractable canopy 25. The opening 22 may be substantially U-shaped, as best seen in FIGS. 2, 4 and 7. The canopy 25 may be made from a flexible fabric, may be supported on bars 28, and may include a window 31. The embodiment shown in FIGS. 1–7 has three such bars 28. FIG. 2 shows all three bars 28, and FIGS. 1, 3, 4 and 5 show that the canopy 25 may fit tightly against the bars 28 so that the location of the bars 28 may be known, but the bars 28 are not visible from behind the cart, except by looking through the window 31. The embodiment of FIG. 8 has four bars 28, but it should be recognized that the invention is not limited to three or four bar arrangements. The bars 28 may be hinged so as to allow the bars 28 to rotate into and out of the canopy storage portion 13.

The canopy 25 may be attached to the bars 28, for example via an overlapping member 34 (see FIG. 2). The overlapping member 34 may be made from the same material as the canopy 25. Along with the canopy 25, the overlapping member 34 may form a sleeve which surrounds a portion of the bar 28. As the bars 28 move into the canopy storage portion 13, the canopy 25 may be taken up and placed in the canopy storage portion 13.

The canopy storage portion 13 may include a base panel 37, an interior panel 40 and an exterior panel 43. FIG. 2 shows the base panel 37 and interior panel 40. The interior panel 40 may extend substantially perpendicularly from the base panel 37. The exterior panel 43 may extend substantially perpendicularly from the base panel 37. In this fashion, a three-sided receptacle may be provided for the canopy 25.

Figure 1:
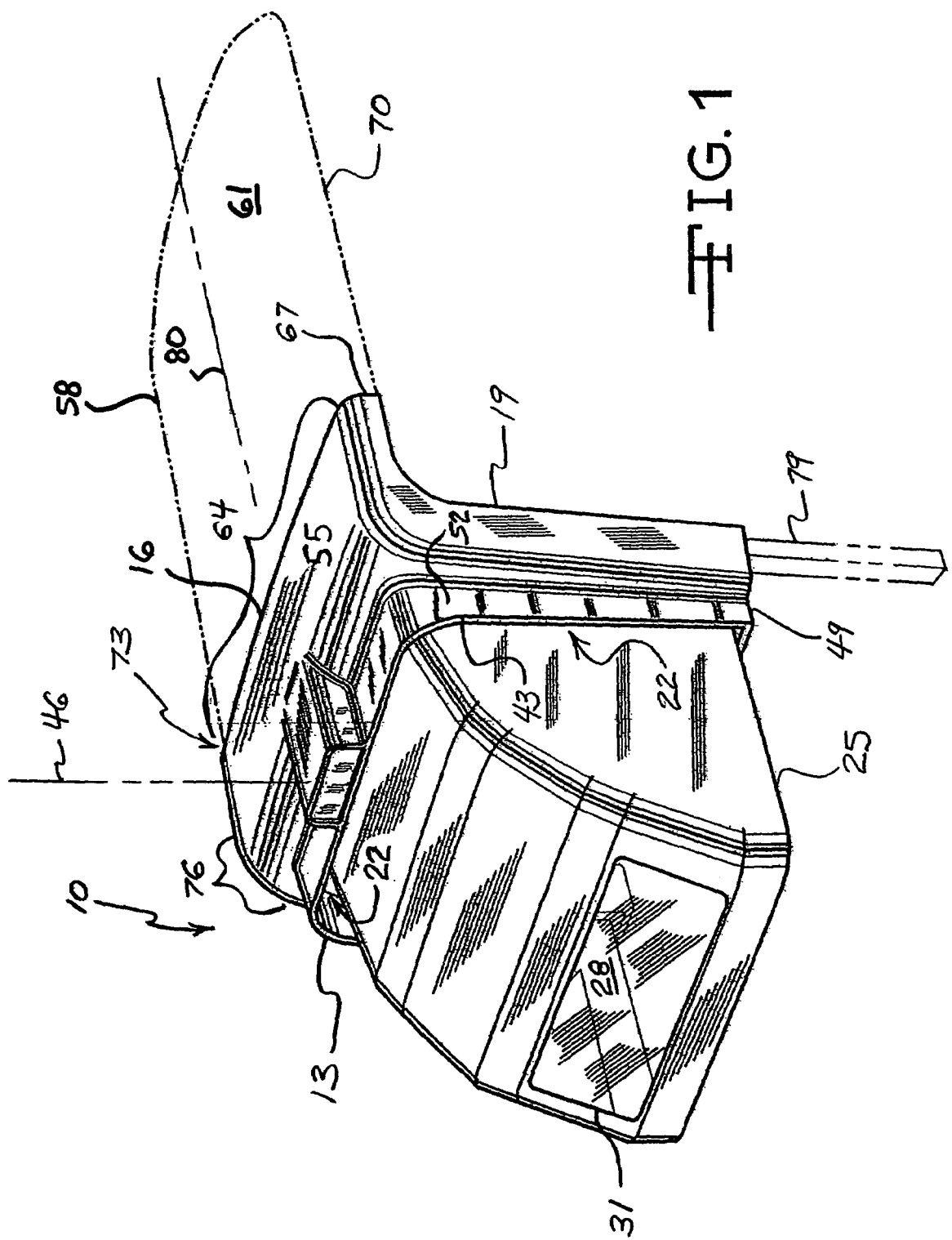
FIG. 1, which is a perspective view of a housing according to the invention with the canopy in the deployed position and supported by three bars.
Figure 2:
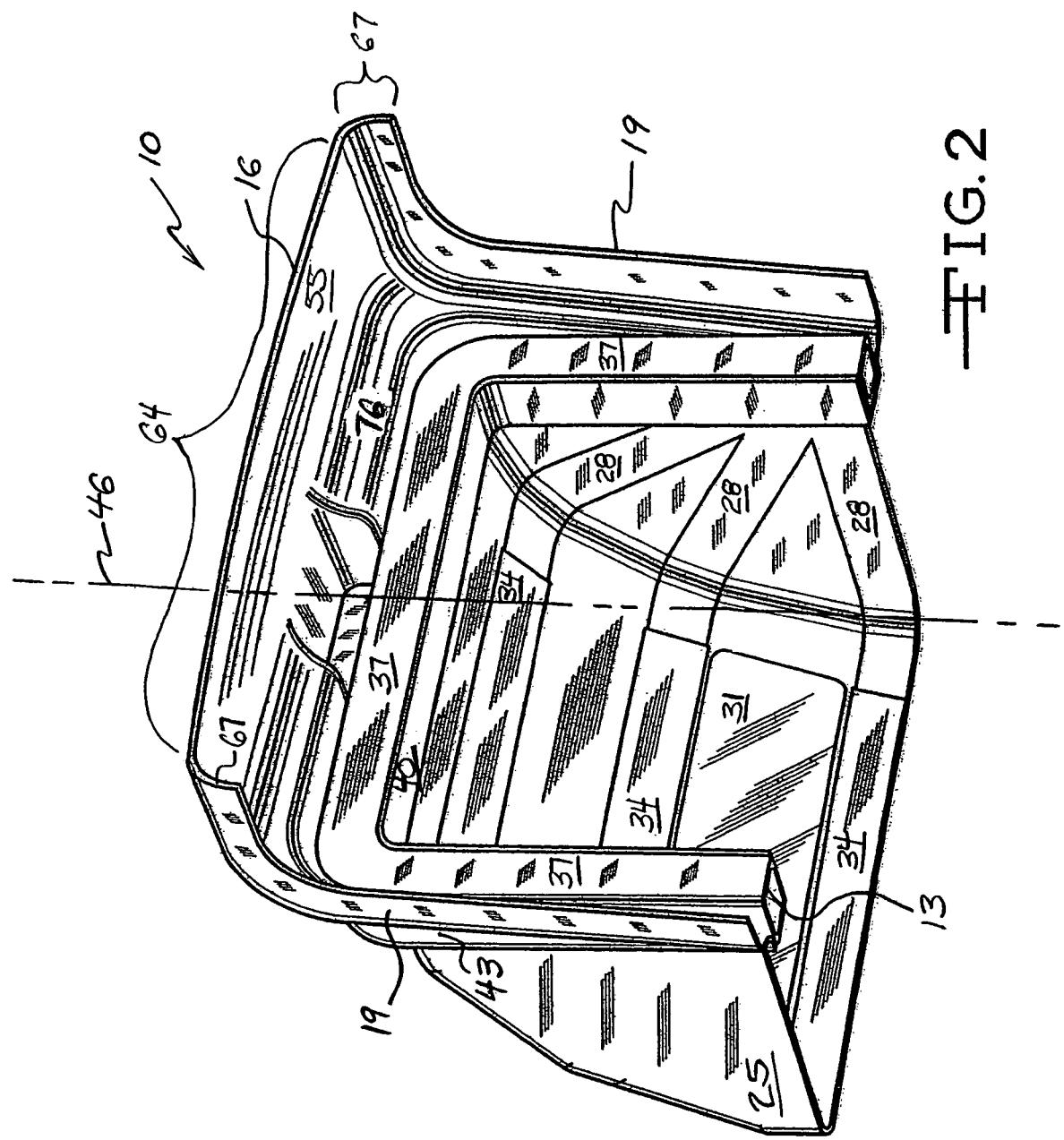
FIG. 2, which is a perspective view of the housing shown in FIG. 1, except that the view shows an underside of the housing and canopy.
Figure 3:
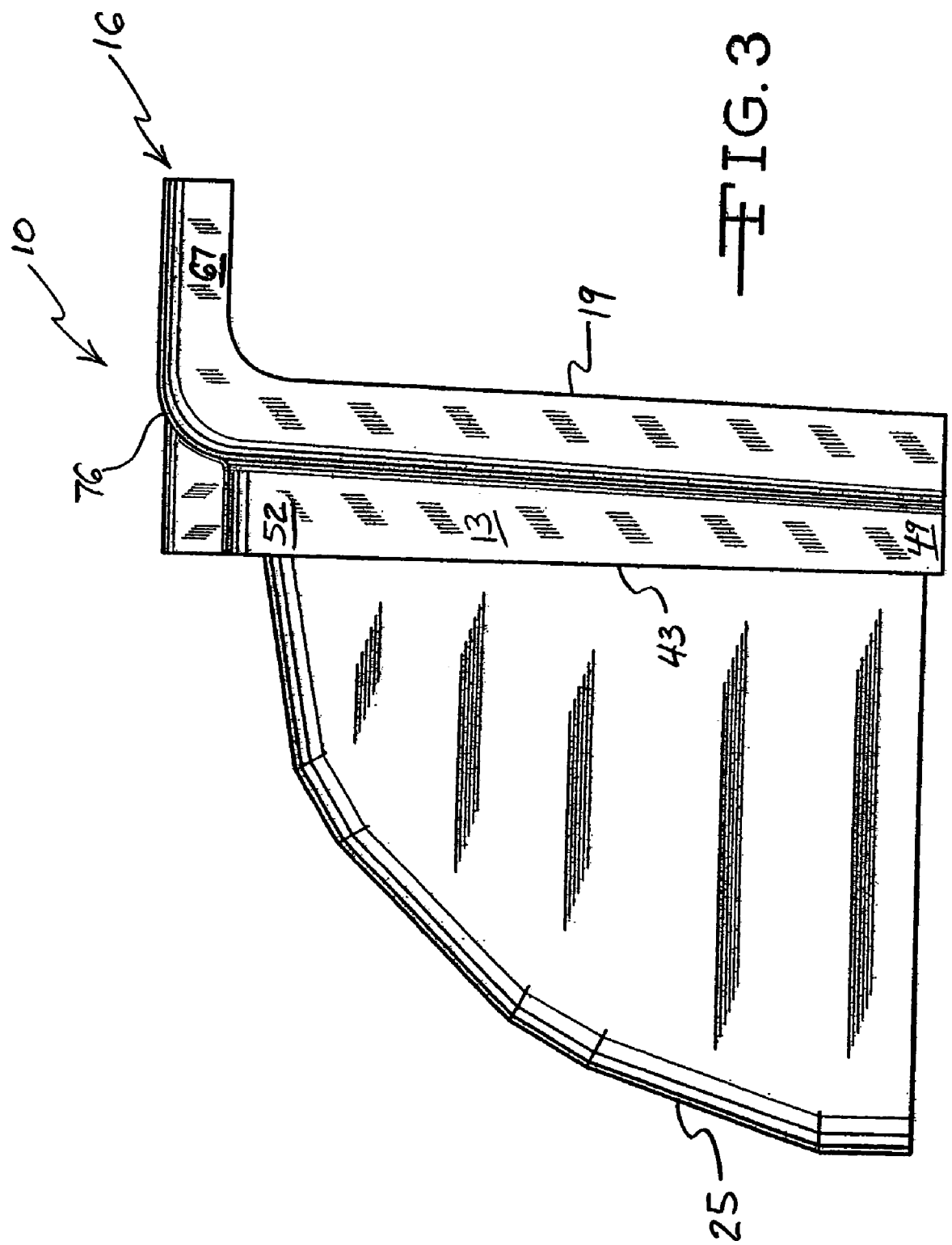
FIG. 3, which is a side view of the housing shown in FIG. 1 with the canopy in the deployed position.

In FIG. 1, the exterior panel 37 of the canopy storage portion 13 is shown slightly sloped toward a mid-line 46 of the housing 10 so that a lower end 49 of the exterior panel 43 is farther from the mid-line 46 than an upper end 52 of the exterior panel 43. FIG. 1 depicts an embodiment of the invention in which the exterior panel 43 has such a slope, but the slope is slight enough that the exterior panel 43 may still be described as substantially parallel with the side panel portion.

The roof engaging portion 16 may have a first section 55 shaped similar to a rear portion of the cart roof 58. For example, the first section 55 of the roof engaging portion 16 may be shaped similar to a top surface 61 of the rear portion of the cart roof 58. The first section 55 of the roof engaging portion 16 may include a first panel portion 64 for extending across a width of the cart roof 58. The first section 55 of the roof engaging portion 16 may include a second panel portion 67 for extending in a direction that is substantially perpendicular to the first panel portion 64 in order to conceal at least part of a side 70 of the cart roof 58 when the housing 10 is installed on the cart.

When mounted to a cart's roof 58, there may be a small step 73 from the cart's roof 58 to the roof engaging portion 16 at a leading edge of the roof engaging portion 16.

The roof engaging portion 16 may have a second section 76 extending between the first section 55 and the canopy storage portion 13. This section 76 may be rounded to provide an aesthetically pleasing appearance.

The housing 10 may include a side panel portion 19 that extends from the roof engaging portion 16 and from the canopy storage portion 13 so as to enable partial concealment of a roof support 79 when the housing 10 is installed on a cart. The side panel portion 19 may extend substantially parallel to a longitudinal centerline 80 of the roof 58. The side panel portion 19 and the second panel portion 67 of the first section 55 of the roof engaging portion 16 may form a substantially L-shaped surface.

Figure 9:
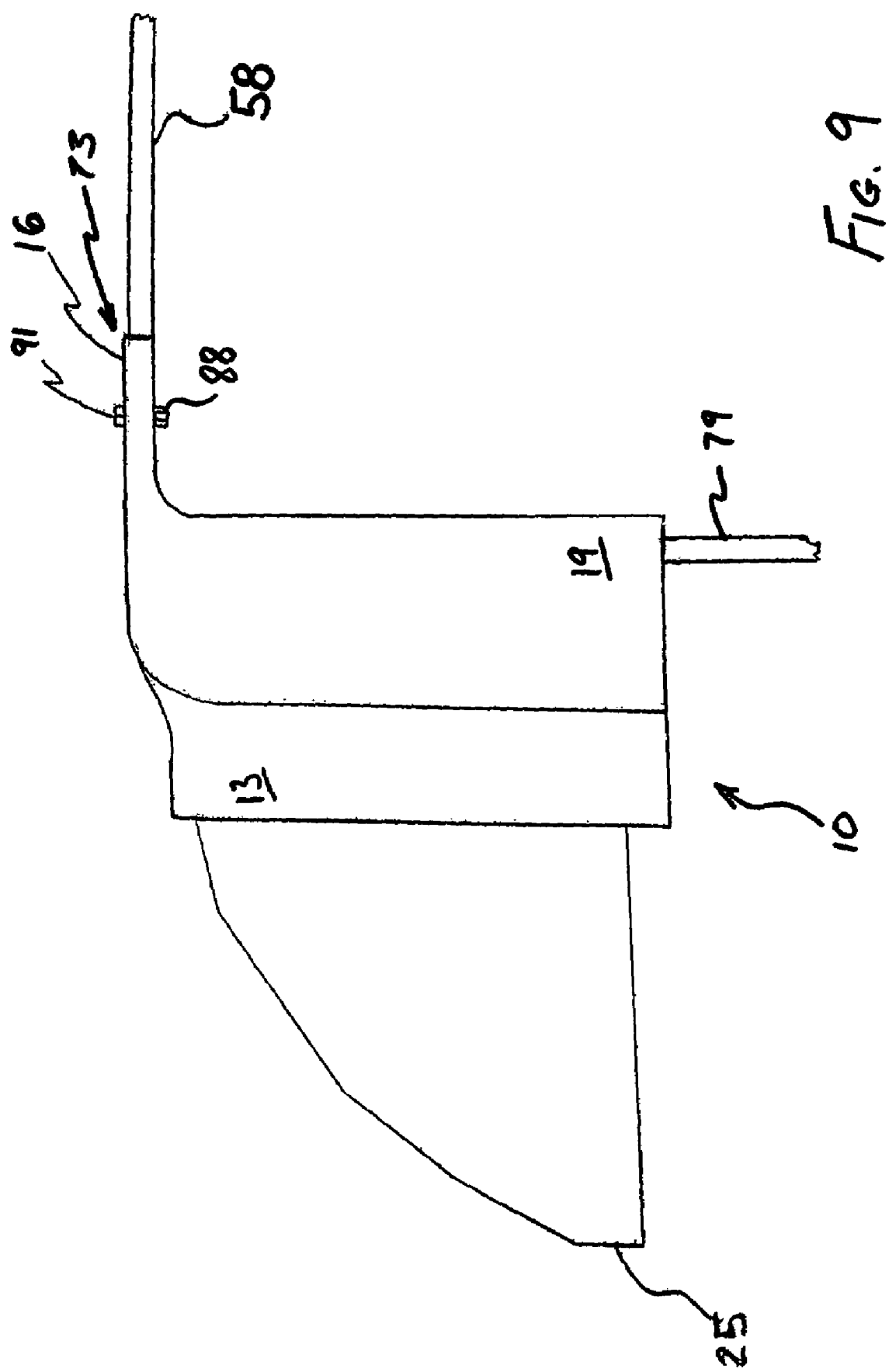
FIG. 9, which is a side view of a housing according to the invention.
Figure 10:
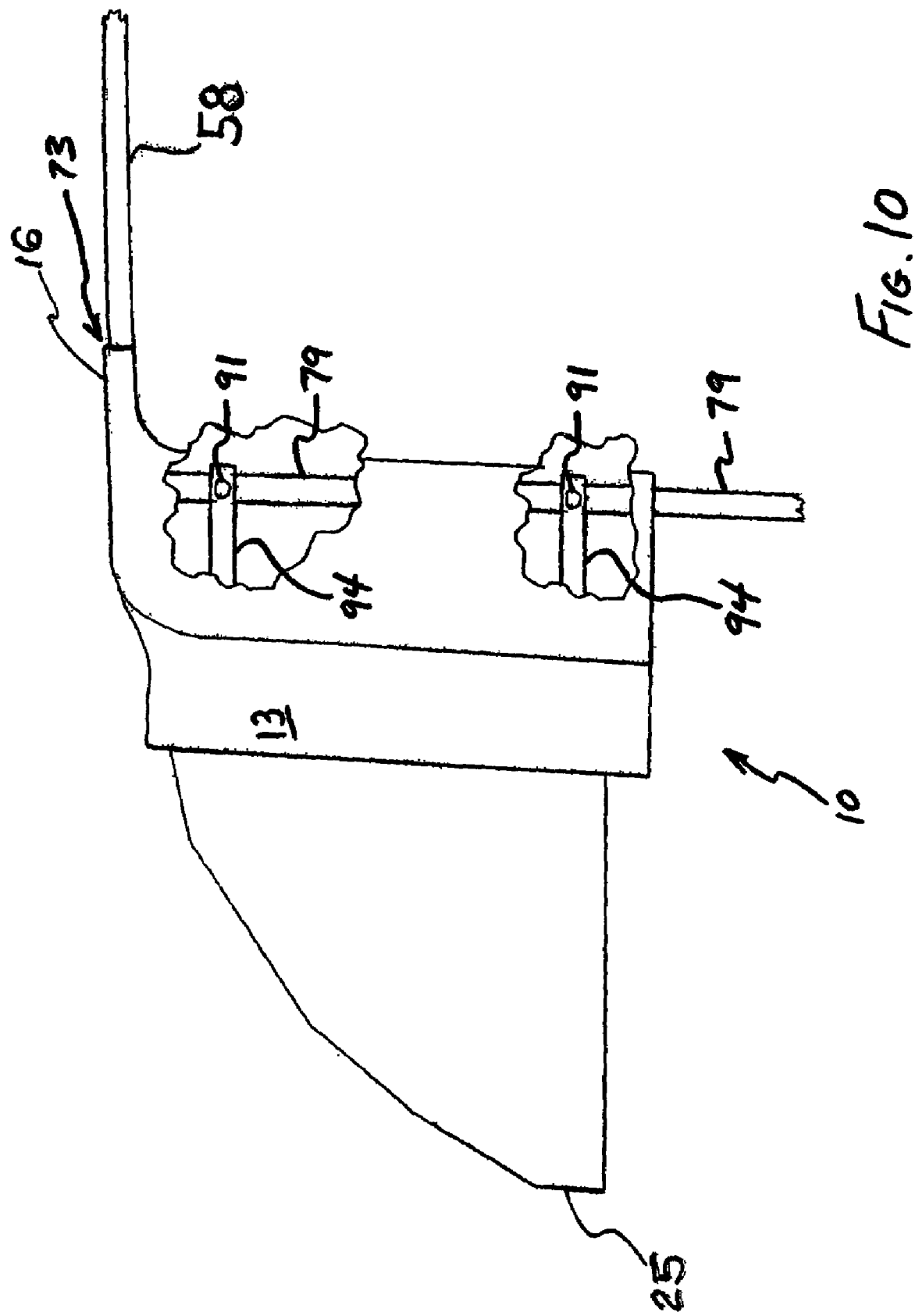
FIG. 10, which is a side view of a housing according to the invention.
Figure 11:
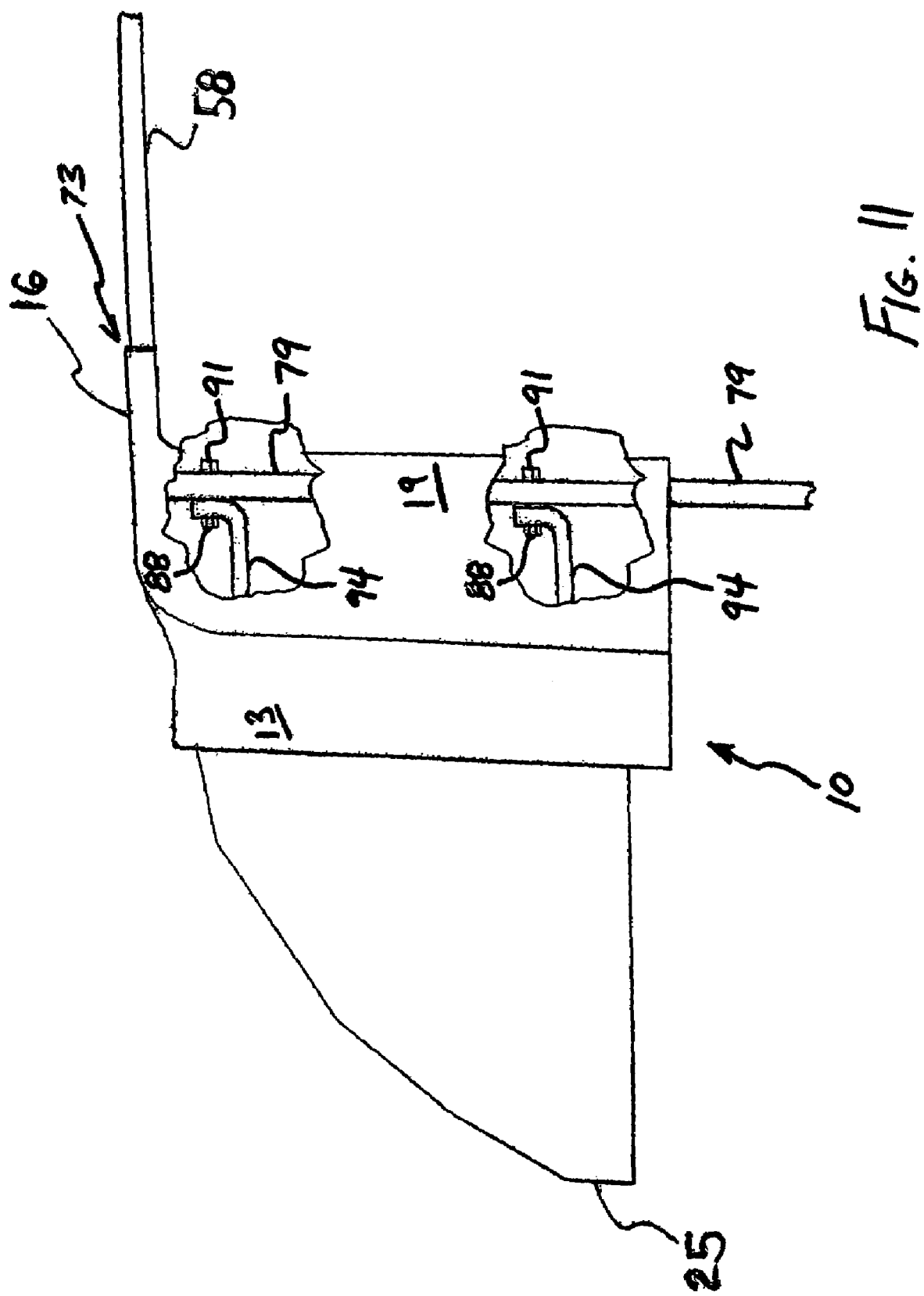
FIG. 11, which is a side view of a housing according to the invention.

The housing 10 may be attached by bolting the roof engaging portion 16 to the roof 58 and/or by bolting the side panel portion 19 to the roof support 79. FIG. 9 depicts an embodiment of the invention in which the roof engaging portion 16 is bolted to the roof 58 using a nut and bolt arrangement. FIG. 10 and FIG. 11 depict embodiments of the invention in which a portion of the side panel portion 19 has been cut away to better illustrate an arm 94 of the side panel portion 19 bolted to the roof support 79. The arm 94 may also extend to the canopy storage portion 13 to provide additional support for the canopy storage portion 13. Often a rack will be provided in the rear portion of the cart for holding objects, such as golf bags, and the canopy storage portion 13 may rest on and be supported from such a rack, and may be attached to such a rack.

Figure 12:
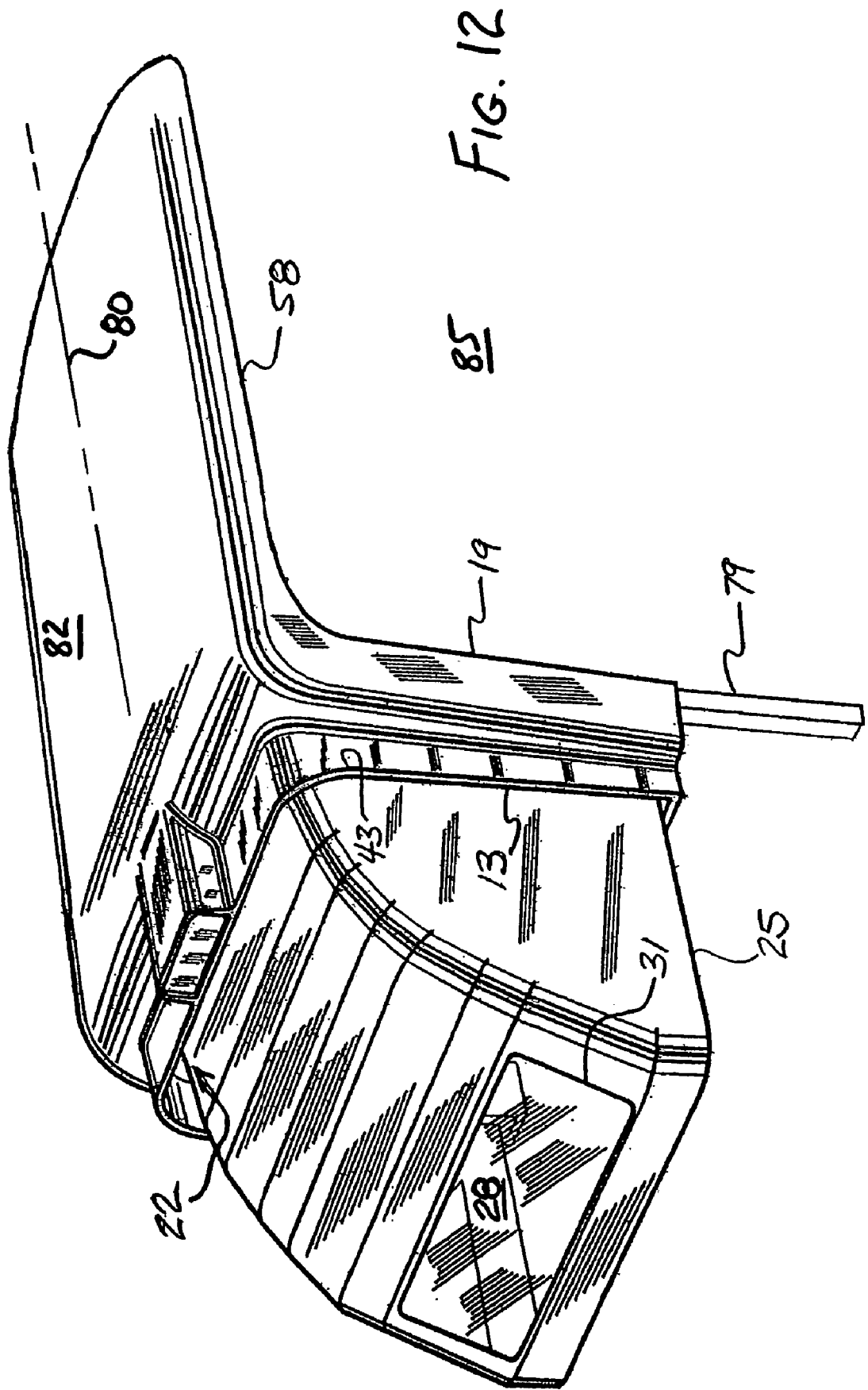
FIG. 12, which is a perspective view of a cart roof according to the invention.

The invention may be integrally connected with the cart roof 58. FIG. 12 is similar to FIG. 1, except that the embodiment shown in FIG. 12 is integral with the cart roof 58. Features identified in FIG. 12 that are similar to features identified in other drawings use the same feature numbers. Such a cart roof may have a cover portion 82, a canopy storage portion 13, and a side panel portion 19. At least part of the cover portion 82 may be positioned above a seating area 85 of the cart.

The canopy storage portion 13 shown in FIG. 12 is shown integrally attached to the cover portion 82, and the canopy storage portion 13 may have an opening 22 for receiving a retractable canopy 25. In FIG. 12, the opening 22 is U-shaped to accommodate the U-shaped bars 28 when the bars 28 are in the canopy storage portion 13. The canopy storage portion 13 may include a base panel 37, an interior panel 40 and an exterior panel 43, similar to those shown in other figures. The interior panel 40 may extend substantially perpendicularly from the base panel 37, or the exterior panel 43 may extend substantially perpendicularly from the base panel 37, or both. In this fashion, a three-sided receptacle may be provided for the canopy 25.

The side panel portion 19 may extend from the cover portion 82 and from the canopy storage portion 13 so as to enable partial concealment of a roof support 79 when the roof 58 is installed on a cart. The side panel portion 19 may extend substantially parallel to a longitudinal centerline 80 of the cover portion 82. The exterior panel 43 of the canopy storage portion 13 may extend substantially parallel with the side panel portion 19.

U.S. provisional patent application Ser. No. 60/646,809 includes description of embodiments of the invention. U.S. provisional patent application Ser. No. 60/646,809 is hereby incorporated by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A cart canopy housing, comprising:
   a canopy storage portion having an opening for receiving a retractable canopy;
   a roof engaging portion, having a first section shaped similar to a rear portion of a cart roof, and having a second section extending between the first section and the canopy storage portion; and
   a side panel portion extending from the roof engaging portion and the canopy storage portion so as to enable partial concealment of a roof support when the housing is installed on a cart.

2. The housing of claim 1, wherein the opening is substantially U-shaped.

3. The housing of claim 1, wherein the canopy storage portion includes a base panel, an interior panel and an exterior panel, wherein the interior panel extends substantially perpendicularly from the base panel.

4. The housing of claim 1, wherein the canopy storage portion includes a base panel, an interior panel and an exterior panel, wherein the exterior panel extends substantially perpendicularly from the base panel.

5. The housing of claim 1, wherein the canopy storage portion includes a base panel, an interior panel and an exterior panel, and the exterior panel is substantially parallel with the side panel portion.

6. The housing of claim 1, wherein the first section of the roof engaging portion is shaped similar to a top surface of the rear portion of the cart roof.

7. The housing of claim 6, wherein the first section of the roof engaging portion includes a first panel portion for extending across a width of the cart roof, and the first section of the roof engaging portion includes a second panel portion for extending in a direction that is substantially perpendicular to the first panel portion in order to conceal at least part of a side of the cart roof when the housing is installed on the cart.

8. The housing of claim 7, wherein the side panel portion and the second panel portion of the first section of the roof engaging portion form a substantially L-shaped surface.

9. The housing of claim 1, wherein the canopy housing is attached to the cart roof.

10. The housing of claim 1, wherein the canopy housing is attached to a roof support of the cart.

11. A cart roof, comprising:
    a cover portion, at least a part of which may be positioned above a seating area of a cart;
    a canopy storage portion attached to the cover portion, the canopy storage portion having an opening for receiving a retractable canopy; and
    a side panel portion extending from the cover portion and the canopy storage portion so as to enable partial concealment of a roof support when the cover portion is installed on a cart.

12. The roof of claim 11, wherein the opening is substantially U-shaped.

13. The roof of claim 11, wherein the canopy storage portion includes a base panel, an interior panel and an exterior panel, wherein the interior panel extends substantially perpendicularly from the base panel.

14. The housing of claim 11, wherein the canopy storage portion includes a base panel, an interior panel and an exterior panel, wherein the exterior panel extends substantially perpendicularly from the base panel.

15. The housing of claim 11, wherein the canopy storage portion includes a base panel, an interior panel and an exterior panel, and the exterior panel is substantially parallel with the side panel portion.

* * * * *